United States Patent [19]

Leichtl

[11] 4,379,574
[45] Apr. 12, 1983

[54] RADIATOR ASSEMBLY (BAYONET LOCK)

[75] Inventor: Ludwig Leichtl, Troy, Mich.

[73] Assignee: Ex-Cell-O Corporation, Troy, Mich.

[21] Appl. No.: 218,836

[22] Filed: Dec. 22, 1980

[51] Int. Cl.³ .............................................. F16L 5/02
[52] U.S. Cl. ................................... 285/211; 285/361;
220/85 SP
[58] Field of Search ............... 285/361, 360, 376, 402,
285/208, 209, 210, 211, DIG. 22, DIG. 7;
165/148; 220/85 SP, DIG. 32

[56] References Cited

U.S. PATENT DOCUMENTS

| | | | |
|---|---|---|---|
| 1,788,282 | 1/1931 | Drager | 285/361 X |
| 2,408,243 | 9/1946 | Vartanian | 285/360 X |
| 2,826,436 | 3/1958 | Hupp et al. | 285/211 X |
| 2,883,083 | 4/1959 | Terry et al. | 285/361 X |
| 3,897,810 | 8/1975 | Arnett et al. | 285/360 X |

Primary Examiner—Dave W. Arola
Attorney, Agent, or Firm—McGlynn and Milton

[57] ABSTRACT

A tank assembly utilized in a heat exchanger such as a radiator and the method of connecting a cylindrical spout such as a filler tube in an opening in the tank wall. An opening is formed in the tank wall with a skirt extending inwardly from the tank wall. A plurality of cam/lock sections are formed at the lower extremity of the skirt with each cam/lock section having a cam surface leading from a receiving end to a locking recess, the opposite wall of which is extended to define a stop. A plurality of radial slots are formed in the tank wall to extend radially of the skirt adjacent the receiving ends of the cam surfaces. A spout is formed having a radially extending shoulder and a lower portion with a plurality of radially extending tabs. An annular seal recess is disposed in the tank wall for receiving a seal. The spout is inserted into the opening by passing the tabs through the slots to engage the tabs with the receiving end of the cam surfaces and the spout is rotated to move the tabs along the cam surfaces until they snap into position in the locking recesses to compress the seal between the shoulder in the spout and the seal recess.

5 Claims, 5 Drawing Figures

RADIATOR ASSEMBLY (BAYONET LOCK)

BACKGROUND OF THE INVENTION

(1) Field of the Invention

The subject invention relates to a tank assembly of the type utilized in a heat exchanger such as a radiator and, more specifically, to the connection of a spout to a wall of the tank.

(2) Description of the Prior Art

Typical of the fabrication of spouts in radiator-type tanks is the disposition of the spout in an opening in the tank wall and soldering the spout to the tank wall. Attendant to this type of fabrication is the use and handling of solder, fluxes and contention with the resultant fumes. Further, the materials of which the spout and tank walls are made must be compatible for soldering, whereas it is definitely more advantageous in many instances to use incompatible or dissimilar materials for the spout and tank wall respectively to reduce material cost and/or to effect the strength or integrity of the assembly.

SUMMARY OF THE INVENTION

A tank assembly including a tank wall having an opening and a cylindrical spout extending from the opening. The spout has a lower portion extending into the opening with at least two radially extending tabs. The opening includes a skirt extending inwardly from the tank wall and having at least two cam lock sections with each cam/lock section including a cam surface leading from a receiving end to a locking recess. The cam surface increases in distance from the tank wall in the direction from the receiving end thereof to the locking recess. The spout and the tank wall have radially extending overlapping portions and a sealing means is disposed between these overlapping portions. The tabs are disposed in the locking recesses to compress the sealing means between the overlying portions and retain the spout in the opening. Thus, the assembly is mechanically assembled by engaging the tabs of the spout with the cam surface and rotating the spout until the tabs are disposed in the locking recesses.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
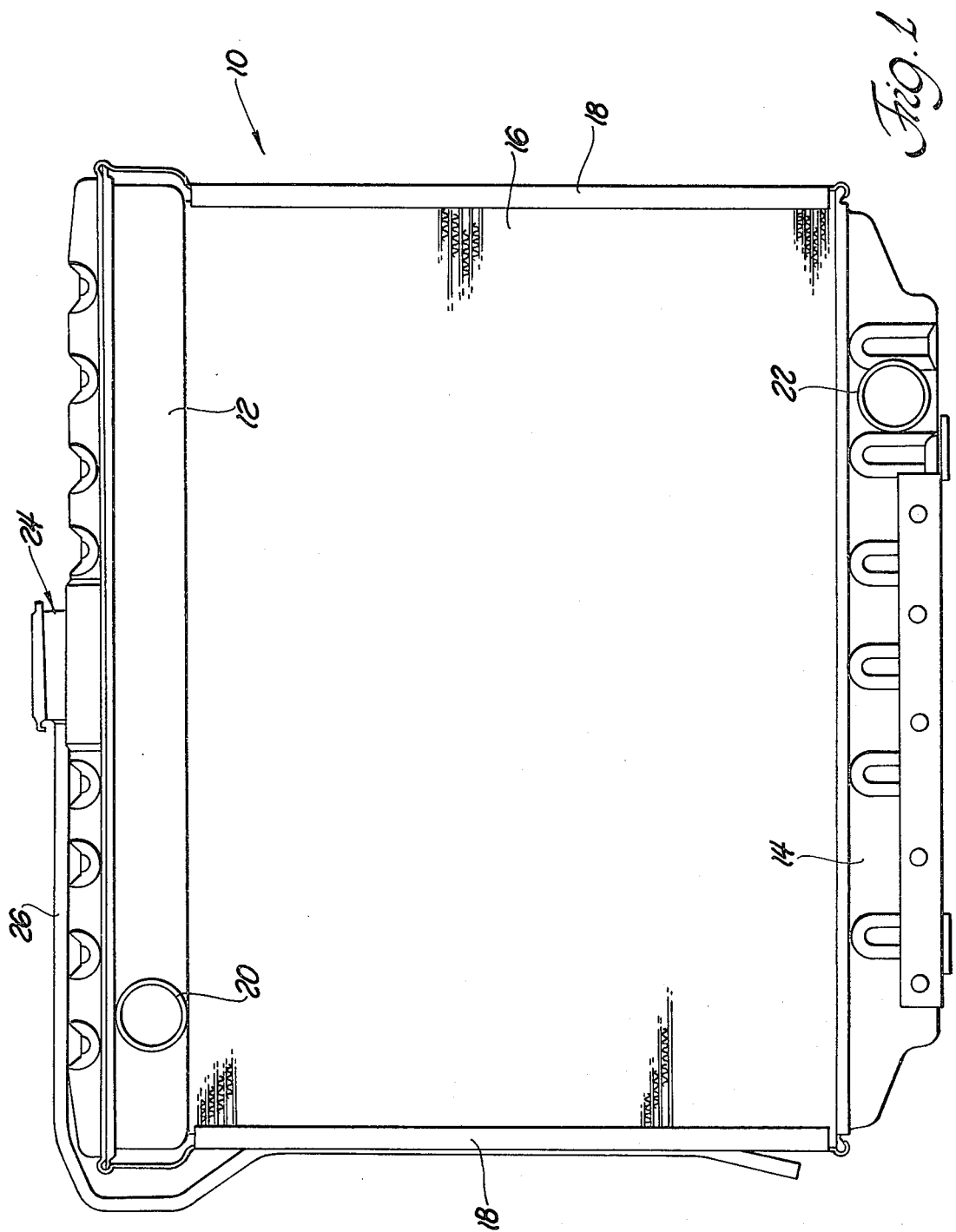
FIG. 1 is an elevational view of a radiator assembly utilizing the tank assembly of the subject invention.

FIG. 1 discloses a heat exchanger in the form of a radiator of the type utilized with an internal combustion engine, the radiator being generally shown at 10. The radiator 10 includes a top tank 12, a bottom tank 14 and a core 16. As is well-known in the art, the core 16 includes tubes extending between the tanks 12 and 14 for fluid communication between the tanks 12 and 14 and heat exchange fins interconnecting the tubes. A pair of side channel members 18 extend along opposite sides of the core and interconnect the tanks 12 and 14. The tanks 12 and 14 include inlet or outlet spouts 20 and 22 for circulating liquid through the engine. The radiator 10 also includes a filler spout generally indicated at 24 with an overflow tube 26 extending therefrom.

Figure 2:
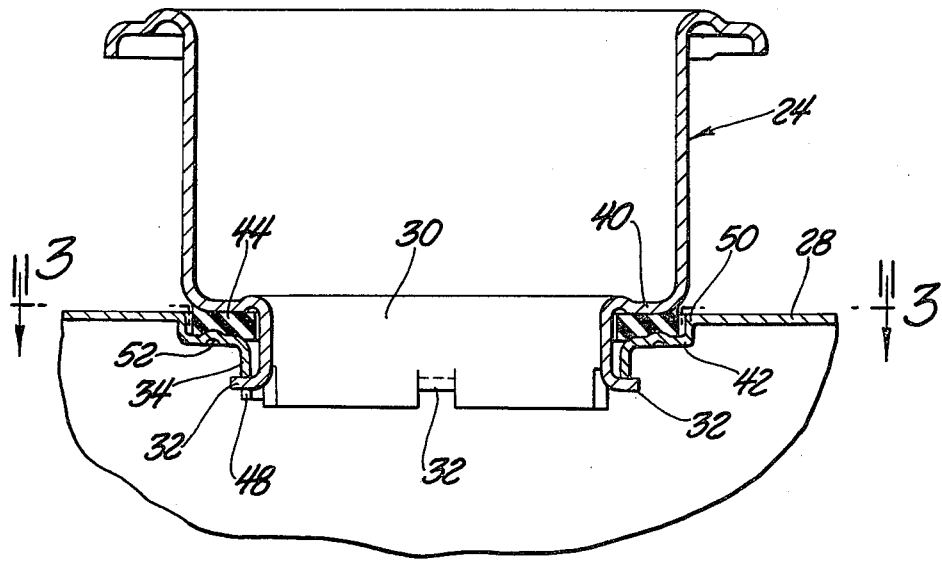
FIG. 2 is an enlarged fragmentary cross-sectional view of the connection of the subject invention between a spout and a tank wall.
Figure 3:
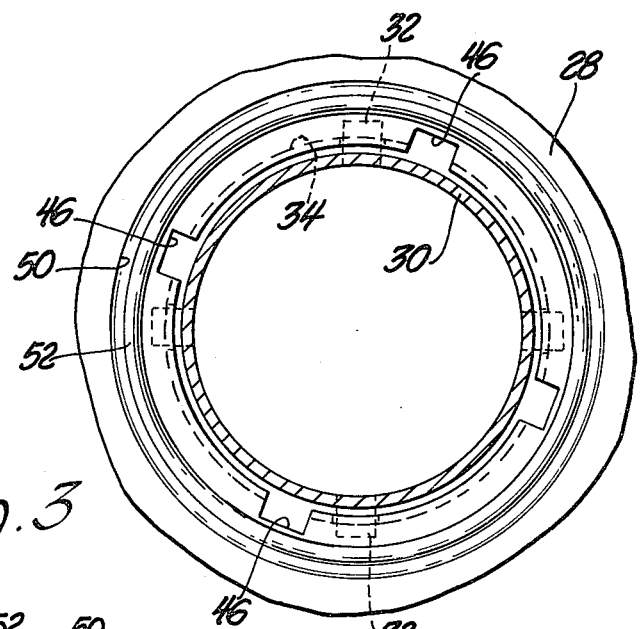
FIG. 3 is a fragmentary cross-sectional view taken substantially along line 3—3 of FIG. 2.
Figure 4:
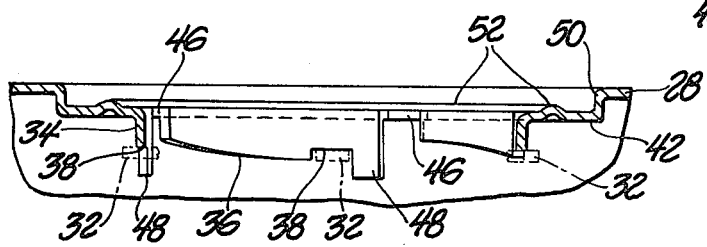
FIG. 4 is a fragmentary cross-sectional view showing the configuration of the tank wall and the skirt extending therefrom.
Figure 5:
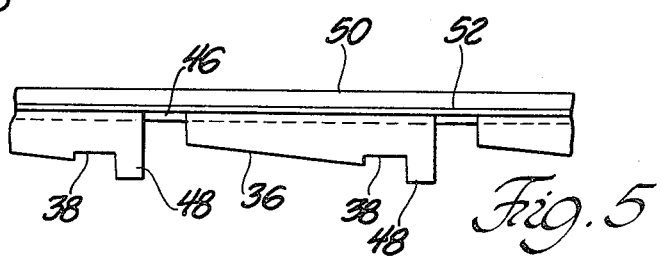
FIG. 5 is a developed view showing the configuration of the skirt extending from the tank wall as it would be projected into a flat configuration or plane.

The subject invention may be utilized with any spout connection with a tank wall, such as the inlets or outlets 20 and 22, but will be specifically described in connection with the filler spout 24. FIG. 2 shows the filler spout 24 but without the overflow tube 26 connected thereto.

The tank assembly 12 includes a tank wall 28 having an opening. The cylindrical spout 24 extends from the opening in the tank wall 28. The spout 24 has a lower cylindrical portion 30 extending into the opening. The lower portion 30 has a plurality (in this case four) outwardly extending tabs 32. Normally an assembly would have at least two tabs which would balance one another, however, the number of tabs depends upon the size of the assembly and other factors.

The opening in the tank wall includes a skirt 34 extending downwardly or inwardly from the tank wall 28. The skirt 34 includes four cam/lock sections with each cam/lock section including a cam surface 36 leading from a receiving end to a locking recess 38. Each cam surface 36 increases in distance from the tank wall 28 in the direction of the cam surface from the receiving end thereof toward the locking recess 38.

The spout 24 and the tank wall 28 have radially extending overlying portions 40 and 42. A sealing means in the form of an elastomeric seal 44 is disposed between the overlying portions 40 and 42. As the tabs 32 are disposed in the locking recesses 38, the seal 44 is compressed between the overlying portions 40 and 42 and the spout is retained in the opening and connected to the tank wall 28.

The overlying portion 42 of the tank wall includes four slots 46 extending radially outwardly of the skirt 34 and adjacent the receiving ends of the cam surfaces 36 for allowing the tabs 32 to pass therethrough and engage the cam surfaces 36.

Each of the tabs 32 is rectangular in cross section and each of the locking recesses has a bottom and parallel side edges which are perpendicular to the bottom for receiving and retaining the tabs 32. In other words, once the tabs 32 are disposed in the locking recesses 38 they are prevented from being removed therefrom. Additionally, the side edge of each recess 38 opposite to the adjacent cam surface 36 is extended to define a stop at 48 adjacent each locking recess 38 for preventing the tabs 32 from moving over the cam surfaces 36 and past the locking recesses 38.

The overlying portion 42 of the tank wall 28 comprises an annular seal recess to define an annular shoulder 50 for radially retaining the seal 44 in the seal recess. In other words, the seal 44 is prevented from extruding radially outwardly when compressed between the overlying portions 40 and 42 because of the shoulder 50.

The spout 24 includes an upper cylindrical portion which has a greater diameter than the lower portion 30 and the overlying portion 40 of the spout 24 comprises or takes the form of a radially extending shoulder integrally interconnecting the upper and lower portions of the spout 24. The outer diameter of the upper portion of the spout 24 is no greater than the diameter of the annular shoulder 50 of the seal recess. This configuration prevents the spout 24 from bottoming out on the tank wall 28 without complete compression of the seal 44.

There is also included an annular sealing ridge 52 extending upwardly from the bottom of the seal recess or overlying portion 42 to further compress the seal 44.

The upper end of the filler spout 24 is flanged outwardly for receiving a closure cap in a manner well-known in the art.

Thus, in assembling the spout 24 to the tank, the opening is formed in the tank wall 28 with the skirt 34 extending inwardly from the tank wall. The cam/lock sections are formed on the skirt 34 and the slots 46 are formed in the tank wall 28. The spout 24 is formed having the overlying portion or shoulder 40 and the lower cylindrical portion with the tabs 32 extending radially outwardly. Preferably, the seal 44 is disposed about the lower portion 30 of the spout 24 and the spout 24 is inserted into the opening by passing the tabs 32 downwardly through the slots 46 and engaging the tabs 32 with the receiving end of the cam surfaces 36 and rotating the spout 24 to move the tabs 32 along the cam surfaces 36 to move the spout 24 inwardly compressing the seal 44 as the tabs are moved into the locking recesses 38 thereby securing the spout 24 to the tank wall 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A tank assembly of the type utilized in a heat exchanger such as a radiator, said assembly comprising; a tank wall having an opening, a cylindrical spout extending from said opening in said tank wall, said spout having a lower portion extending into said opening, said lower portion having at least two radially extending tabs, said opening having a skirt extending inwardly from said tank wall, said skirt having at least two cam/lock sections with each cam/lock section including a cam surface leading from a receiving end to a locking recess, said cam surface increasing in distance from said tank wall in the direction from said receiving end thereof to said locking recess, said spout and said tank wall having radially extending overlying portions, and sealing means disposed between said overlying portions, said tabs being disposed in said locking recesses to compress said sealing means between said overlying portions and retaining said spout in said opening, said overlying portion of said tank wall defining an annular seal recess to define an annular shoulder for radially retaining said sealing means in said recess, said spout including an upper cylindrical portion of a greater diameter than said lower portion thereof, said overlying portion of said spout comprising a radially extending shoulder integrally interconnecting said upper and lower portions, the outer diameter of said upper portion of said spout being no greater than the diameter of said annular shoulder of said seal recess.

2. An assembly as set forth in claim 1 wherein said overlying portion of said tank wall includes at least two slots extending radially of said skirt adjacent said receiving ends of said cam surfaces for allowing said tabs to pass therethrough and engage said cam surfaces.

3. An assembly as set forth in claim 2 wherein each of said tabs are rectangular in cross section and each of said locking recesses has a bottom and parallel side edges which are perpendicular to the bottom for receiving and retaining said tabs.

4. An assembly as set forth in claim 3 including a stop adjacent each locking recess for preventing said tabs from moving over said cam surfaces and past said locking recesses.

5. An assembly as set forth in claim 1 including an annular sealing ridge extending upwardly in said seal recess and compressing said sealing means.

* * * * *